United States Patent
Nakano et al.

(10) Patent No.: US 6,924,442 B2
(45) Date of Patent: Aug. 2, 2005

(54) ELECTRONIC INPUT APPARATUS AND METHOD THEREOF

(75) Inventors: Masayoshi Nakano, Machida (JP); Hirohide Komiyama, Kanagwawa-ken (JP); Takayuki Akai, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 09/683,281

(22) Filed: Dec. 7, 2001

(65) Prior Publication Data

US 2002/0074171 A1 Jun. 20, 2002

(30) Foreign Application Priority Data

Dec. 19, 2000 (JP) ........................................ 2000-385712

(51) Int. Cl.[7] ........................ G06K 11/18; G06K 11/06; G06K 9/00; G08C 21/00; G09G 5/00
(52) U.S. Cl. .................... 178/19.01; 345/173; 345/178; 345/179; 178/18.01; 178/18.03; 178/19.02; 178/19.03; 178/19.04; 178/19.05; 178/20.01; 382/188
(58) Field of Search ................................ 345/173, 178, 345/179; 382/188; 178/18.01, 18.03, 19.01, 19.04, 20.01, 19.02, 19.03, 19.05

(56) References Cited

U.S. PATENT DOCUMENTS

| | | | | |
|---|---|---|---|---|
| 3,819,857 A | * | 6/1974 | Inokuchi | 178/18.07 |
| 5,565,632 A | * | 10/1996 | Ogawa | 73/862.69 |
| 5,599,122 A | * | 2/1997 | Yu | 401/31 |
| 5,633,471 A | * | 5/1997 | Fukushima | 73/865.4 |
| 5,736,980 A | * | 4/1998 | Iguchi et al. | 345/179 |
| 5,737,740 A | * | 4/1998 | Henderson et al. | 715/530 |
| 5,832,113 A | * | 11/1998 | Sano | 382/187 |
| 6,067,080 A | * | 5/2000 | Holtzman | 345/173 |
| 6,342,901 B1 | * | 1/2002 | Adler et al. | 345/700 |
| 6,362,440 B1 | * | 3/2002 | Karidis et al. | 178/18.01 |
| 6,744,426 B1 | * | 6/2004 | Okamoto et al. | 345/179 |

* cited by examiner

Primary Examiner—Henry N. Tran
Assistant Examiner—Peter Prizio, Jr.
(74) Attorney, Agent, or Firm—Ido Tuchman; Derek S. Jennings

(57) ABSTRACT

A pen input apparatus includes a plurality of penpoints for drawing tracks on a recording medium such as paper, and a selector for selecting a specific penpoint from the plurality of penpoints. The input apparatus including a type recognition unit for recognizing the type of the selected penpoint (such as the color of a line which can be drawn, the thickness of the line, pen type such as ballpoint pen, sign pen or fluorescent pen), and a transmitter for transmitting the track of the penpoint as position information, and transmitting the information on the type recognized by the type recognition unit to a computer system.

18 Claims, 8 Drawing Sheets

[Figure 1]
(a)
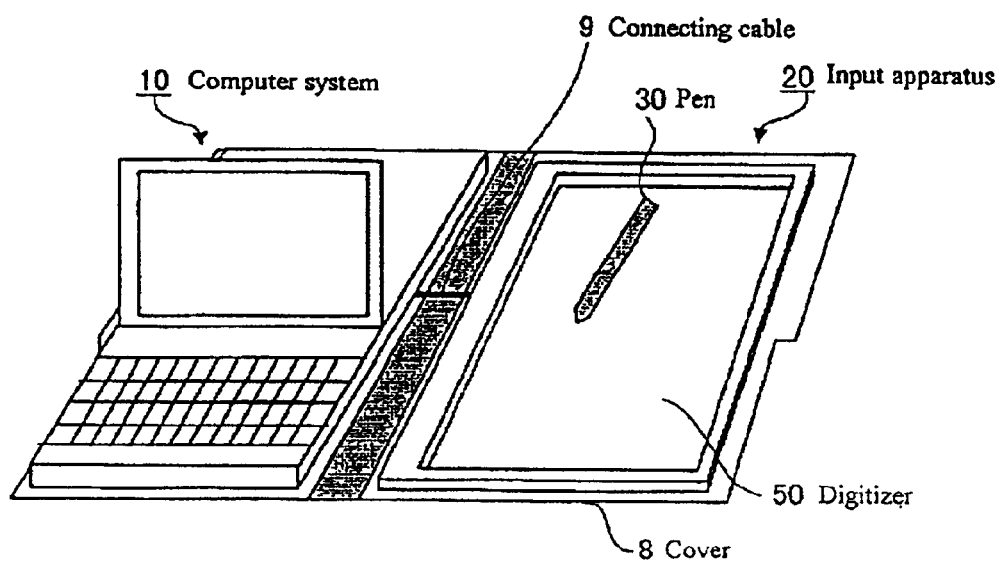
(b)
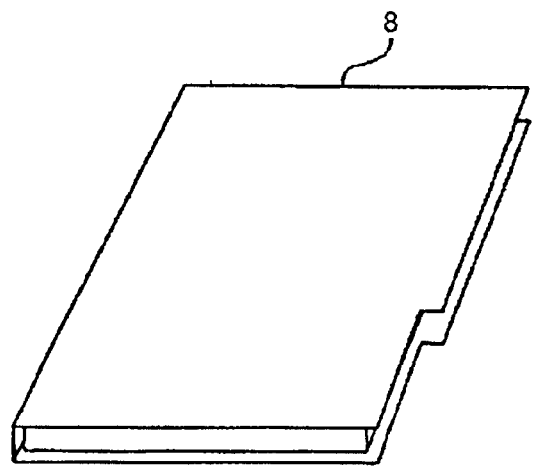

[Figure 2]
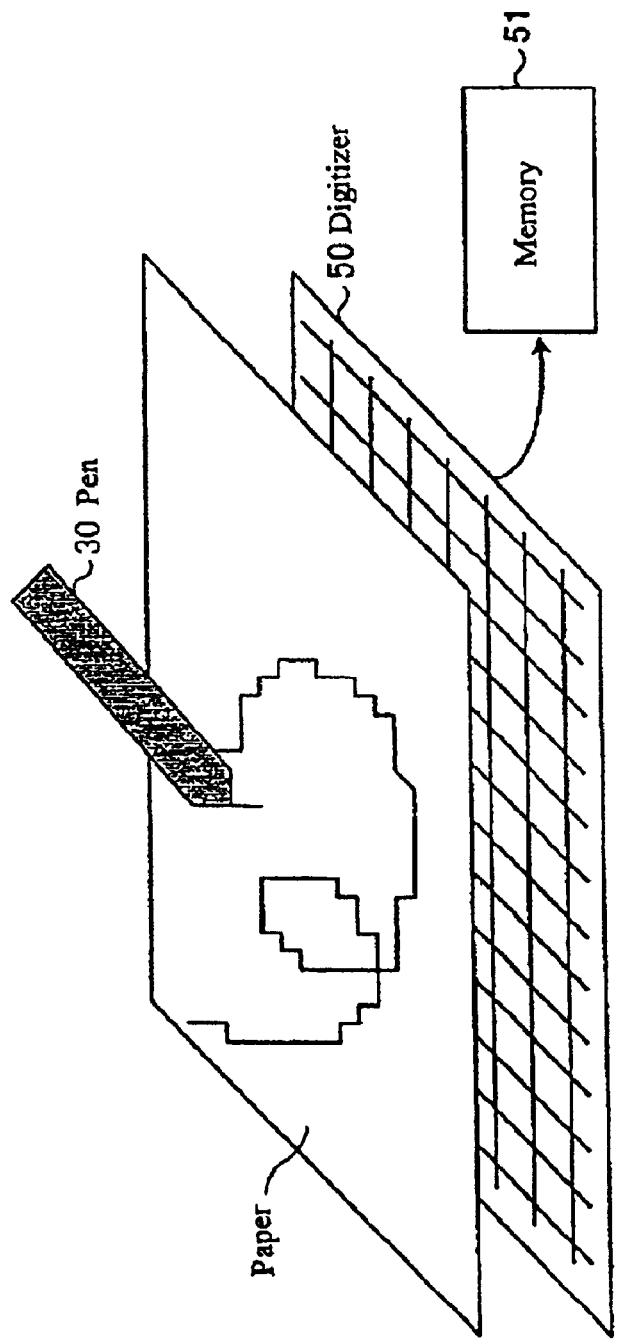

[Figure 3]
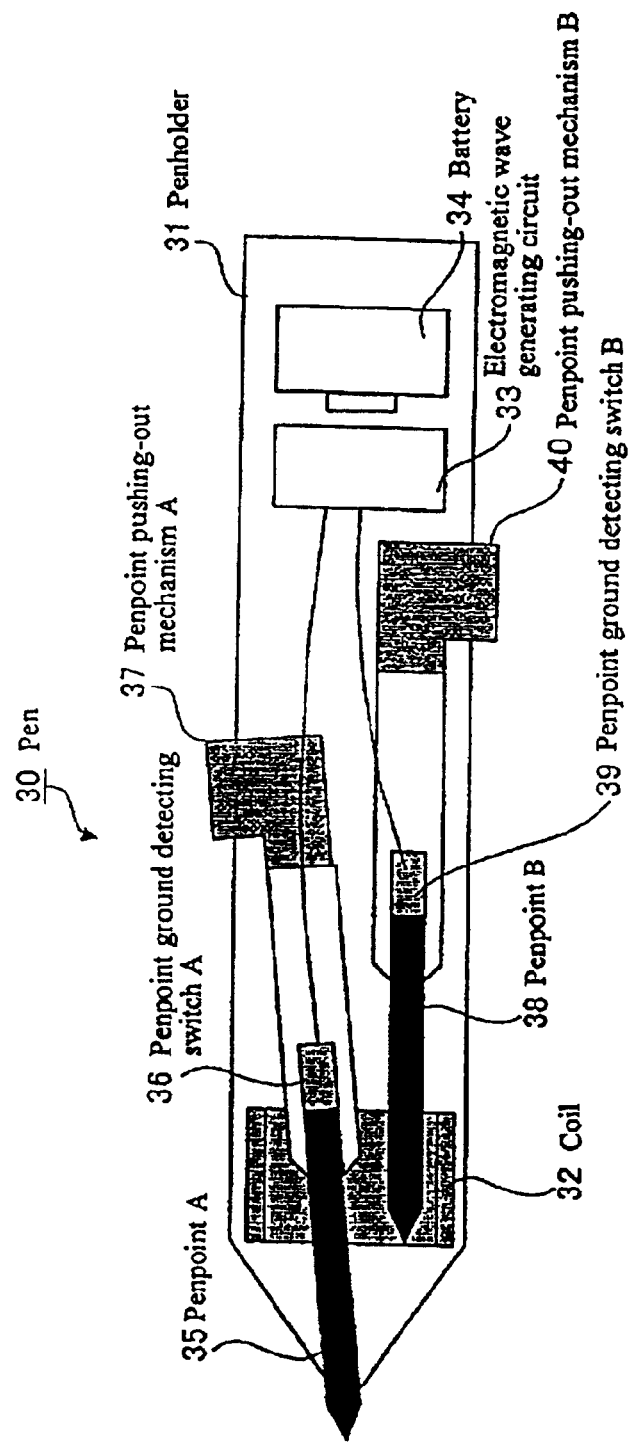

[Figure 4]
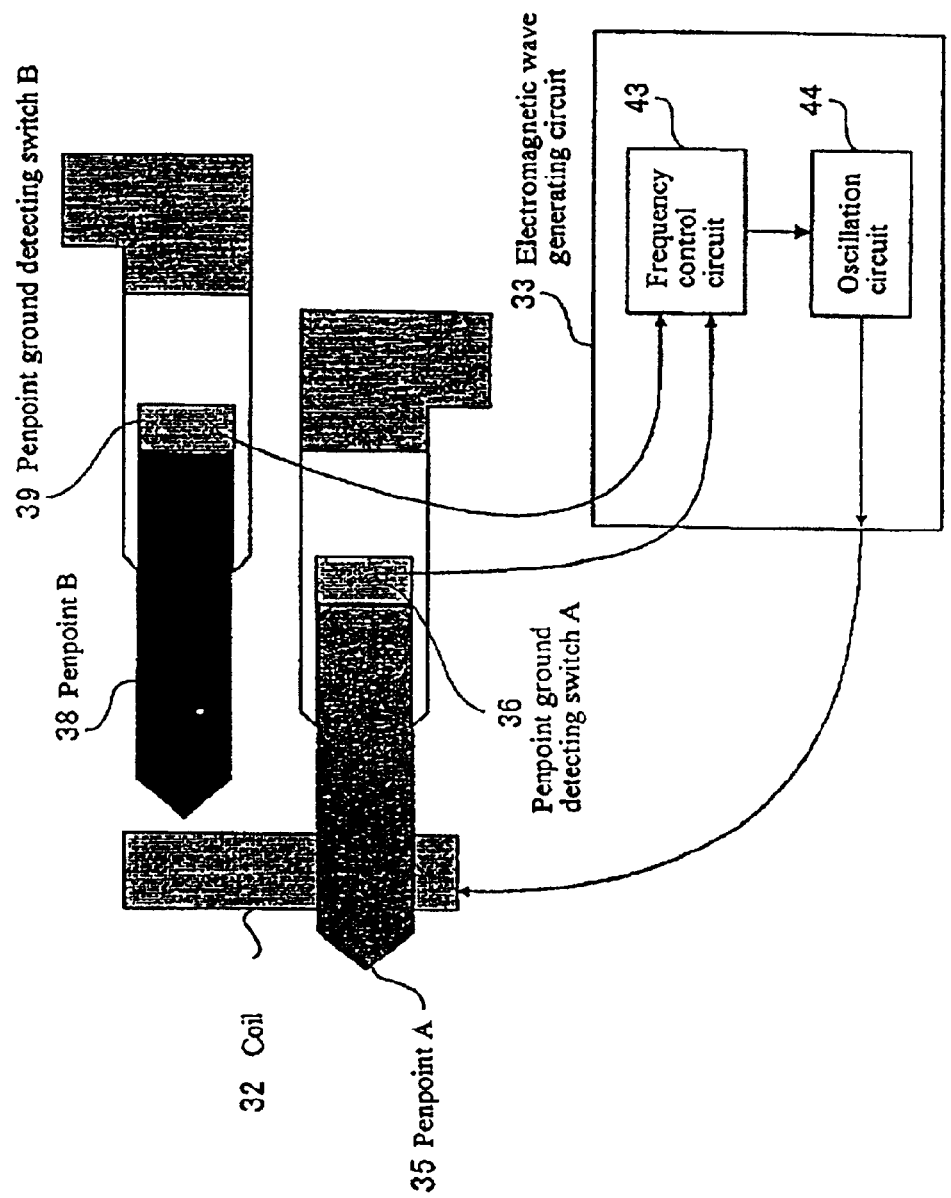

[Figure 5]
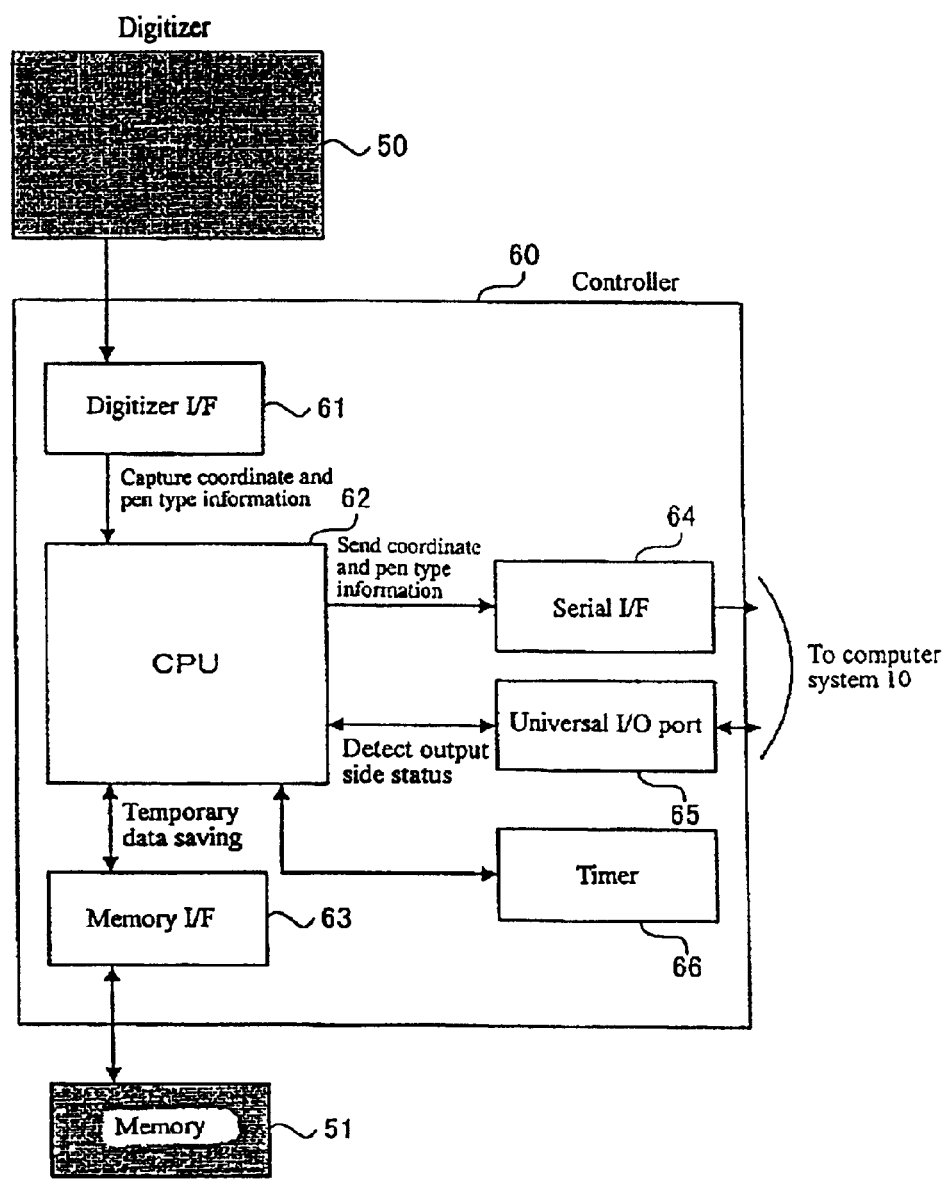

[Figure 6]
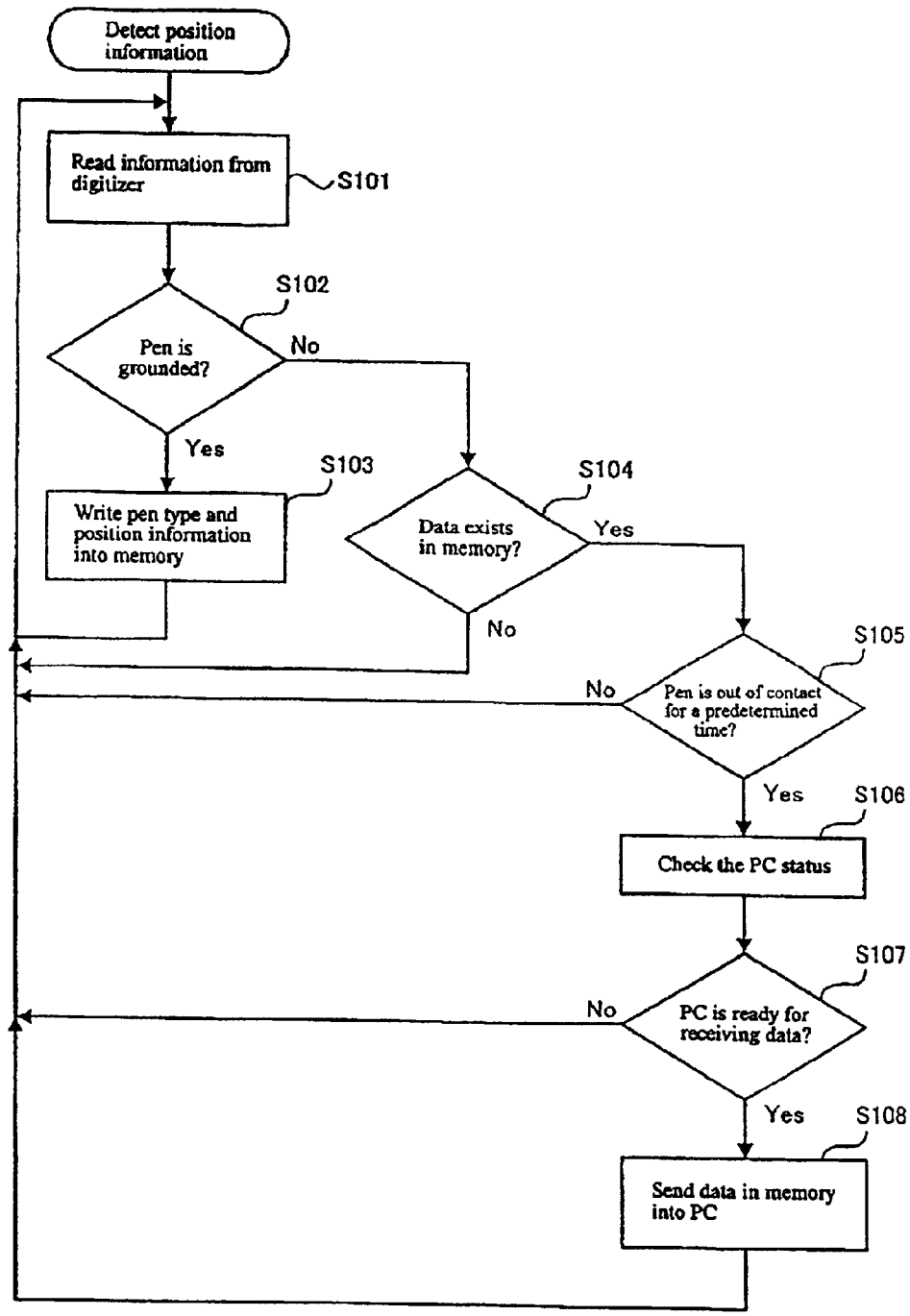

[Figure 7]
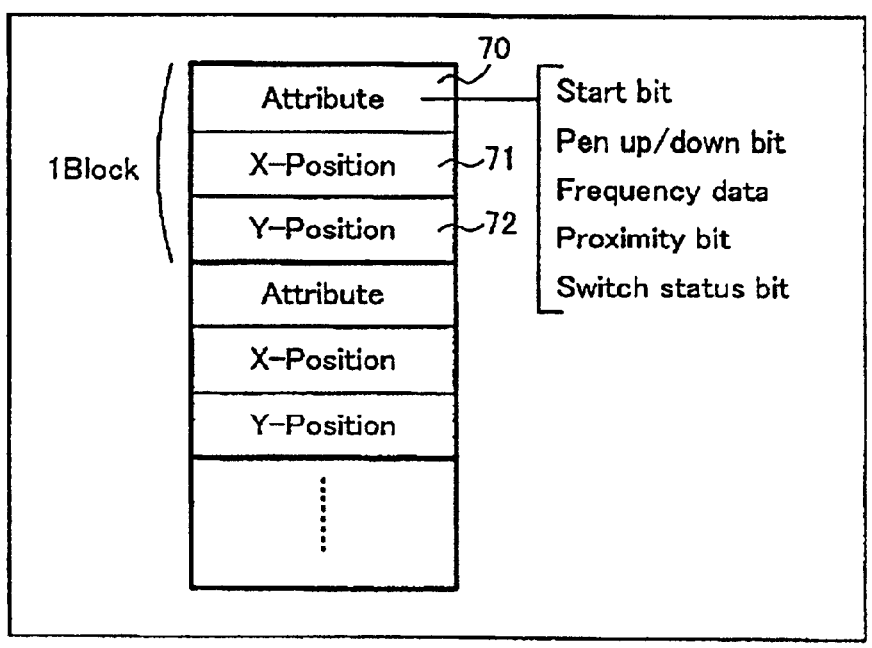

[Figure 8]
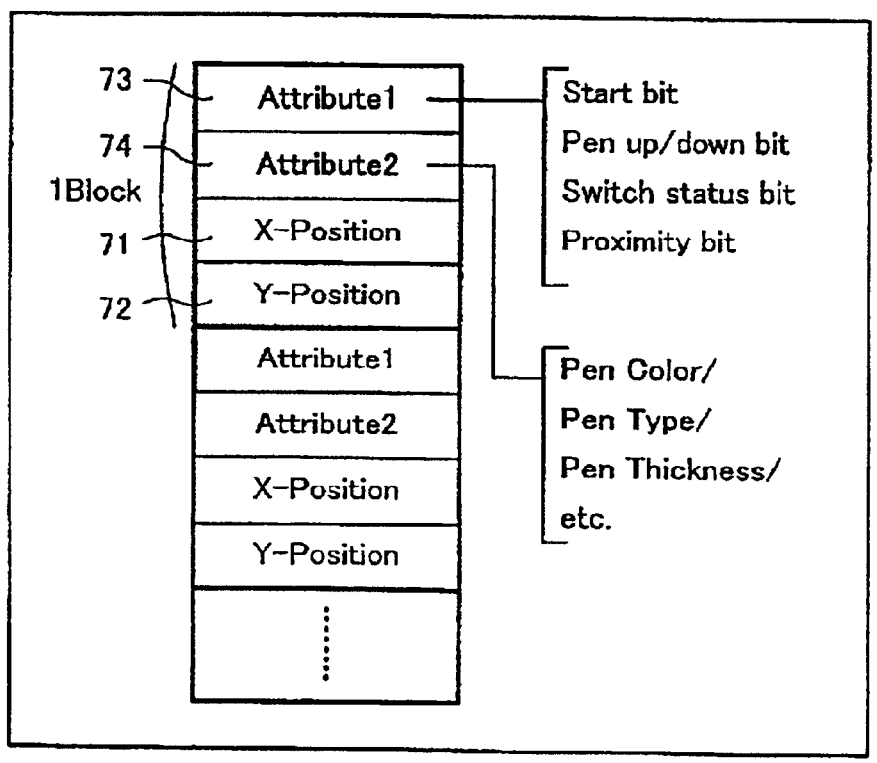

ELECTRONIC INPUT APPARATUS AND METHOD THEREOF

BACKGROUND OF INVENTION

1. Field of the Invention

The present invention relates to an electronic input apparatus for sending input information to a computer system, and particularly to an electronic input apparatus and the like for sending input information written with a pen on a piece of paper placed on a digitizer to a computer system.

2. Background Art

In computer systems such as various personal computers and PDA (Personal Digital Assistants), an input apparatus is connected for sending operation instructions and various information to such computer systems. The typical one is a keyboard or mouse, and a joystick often used with a game machine, and a tablet used for precision input for CAD and for illustration are also widely used. This tablet is provided with a plate-like pressure-sensing surface, and a pen for inputting. Touching the pressure-sensing surface with the pen enables the corresponding absolute position on a screen to be pointed to, and allows fine inputting of coordinates or graphics as compared with the mouse and the like.

Thus, for instance, in the conventional input apparatus such as tablet, input information drawn by the user with a pen can be transmitted to a computer system. However, the drawn input information is reproduced on the screen of the computer system, but the input information does not remain on a medium such as paper. For this, pen input information to a document requiring handwriting cannot be directly input to the computer system by using a tablet, and it is required that it should be once input to a piece of paper and thereafter reentered by a scanner or the like. Since the same track can not be electronically recorded simultaneously with the writing performed to the medium such as paper with a pen, no large savings in time and effort can be made when the user inputs required handwritten information.

Further, the conventional input apparatus does not electronically record the same track simultaneously with the writing with a pen, if the writing is to be performed using penpoints having different attributes such as color and thickness rather only one type of penpoint.

In the conventional input apparatus, only coordinate information can be transmitted to the computer system, and no other attribute information can be transmitted. For instance, in the inputting using the conventional "painting tool," it has been only possible that a color, type, thickness and the like are specified on application software before or after the inputting, to directly enter the drawing by the input apparatus into the computer system.

The present invention was accomplished to solve the above technical problems, and it aims to enable inputting to be performed with different pen types or colors in an input apparatus for electronically recording tracks written with a pen.

Further, another object is to transmit attribute information such as pen type or color along with coordinate information when input information is transmitted from the input apparatus to a computer system.

SUMMARY OF INVENTION

Under such objects, in the present invention, the input pen is changed, or switched to a different type of pen for making a drawing on the paper placed on a digitizer, the type of the line recorded on the digitizer is automatically changed to enable electronic recording of the same image as that recorded on a recording medium such as paper. That is, the input system to which the present invention is applied is characterized by comprising: a pen input apparatus having a plurality of penpoints for drawing tracks on a recording medium such as paper, and a selector for selecting a specific penpoint from the plurality of penpoints; and an input apparatus including a type recognition unit for recognizing the type of the selected penpoint (such as the color of a line which can be drawn, the thickness of the line, pen type such as ballpoint pen, sign pen or fluorescent pen), and a transmitter for transmitting the track of the penpoint as position information, and transmitting the information on the type recognized by the type recognition unit to a computer system.

If grasped from another viewpoint, the present invention is an electronic input apparatus for transmitting input information drawn with a pen to a computer system, and characterized by comprising a coordinate information recognition unit for recognizing a track drawn with a pen as coordinate information, a type recognition unit for recognizing the type of the pen, for instance, by the frequency of an electromagnetic wave generated from the pen, and a transmitter for transmitting the coordinate information recognized by the coordinate recognition unit to the computer system, and adding the information about the type recognized by the type recognition unit to the coordinate information and transmitting them to the computer system. The pen used here includes those having a plurality of penpoint types for one pen and constructed to switch them, and also those in which a different pen is used for each type.

Further, the present invention is characterized by comprising a digitizer for grasping the track drawn by a penpoint selected in a writing instrument having a plurality of penpoints and allowing a predetermined penpoint to be selected from the plurality of penpoints, and recognizing the attribute of the penpoint, and an interface for outputting the position information obtained from the track of the penpoint grasped by the digitizer and attribute information about the recognized attribute.

On the other hand, the writing instrument for inputting to a digitizer, to which the present invention is applied, is characterized by comprising a plurality of types of penpoints for drawing images on a recording medium placed on the digitizer, a penpoint selector for selecting a specific penpoint from the plurality of penpoints, and an electromagnetic wave outputting unit for generating to the digitizer an electromagnetic wave of a different frequency for each selected penpoint. The penpoint type includes the color and thickness of lines which can be drawn, and different materials.

Further, the digitizer to which the present invention is applied is characterized by comprising a track recognition unit for recognizing the track of a pen manipulated by the user, a pen information recognition unit for recognizing the information on the pen type by the information obtained from the pen, and an output unit for generating position information from the recognized track, and adding the information on the recognized pen type to the generated position information and outputting them. As the form of recognizing the pen type, there is the one in which, by the electromagnetic wave generated for each pen type, the frequency of the electromagnetic wave is analyzed to recognize the pen type.

The present invention can be grasped as a method invention. A method for inputting coordinates to which the present invention is applied is characterized by receiving position information based on a track drawn by the user on a recording medium such as a piece of paper placed on a coordinate input apparatus, and receiving, from the coordinate input apparatus, attribute information on the type of the line used for the track drawn to reflect the received attribute information on the received position information, and electronically recording the image information corresponding to the track drawn by the user on the recording medium.

Further, the present invention is a method for transmitting coordinate information for transmitting coordinate information from a coordinate input apparatus to a computer system, and characterized by expressing the position information based on a track drawn by the user on the coordinate input apparatus by X-coordinates and Y-coordinates, adding attribute information on the type of the line delineating the track to the position information expressed by X- and Y-coordinates to form a block, and transmitting the formed block in a predetermined unit.

Further, the present invention is a storage medium having stored therein a program to be run on a computer so that the computer can read the program, and characterized in that the program causes the computer to execute: a process for receiving position information based on a track drawn by the user on the paper placed on a coordinate input apparatus, and receiving attribute information based on the type of the line used for the line drawn on the paper from the coordinate input apparatus; a process for recognizing the type of the line from the received attribute information; and a process for reflecting the recognized line type on the received position information to electronically record image information corresponding to the track drawn by the user on the paper.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF DRAWINGS

FIGS. 1A and 1B are schematic diagrams showing the whole electronic input system to which the embodiment is applied.

FIG. 2 is an explanatory view showing how inputting is made to the digitizer 50 with the pen 30.

FIG. 3 is a block diagram schematically showing the pen 30 to which the embodiment is applied.

FIG. 4 is a diagram for explaining the internal connections of the pen 30.

FIG. 5 is a diagram showing the block configuration in the signal processing of the input apparatus 20.

FIG. 6 is a flowchart showing the flow of the data processing performed in the controller 60.

FIG. 7 is a diagram showing an example of the data format sent from the input apparatus 20 to the computer system 10.

FIG. 8 is a diagram showing another example of the data format sent from the input apparatus 20 to the computer system 10.

DETAILED DESCRIPTION

The transmission of the information written by the user with a pen on a piece of paper, includes attribute information including, for instance, the color and thickness of the pen, and whether or not the pen is of a fluorescent color can be transmitted along with the predetermined coordinate information drawn by the user, it is preferred in the point that the work for inputting to the computer system is considerably reduced, and various input styles taken by users can be promptly handled.

Further, it is characterized in that the pen input apparatus further comprises a frequency generator for generating a different frequency for each penpoint selected by the selector, and an electromagnetic wave outputting unit for outputting an electromagnetic wave having the frequency generated by the frequency generator, and the type recognition unit recognizes the type of the selected penpoint based on the frequency of the electromagnetic wave output by the electromagnetic wave outputting unit. This construction is preferred in the point that, even if the user arbitrarily changes the penpoint type for use, information can be appropriately grasped, for instance, in a digitizer which performs conversion to coordinate information.

Further, it can be characterized in that the selector includes a penpoint pushing-out mechanism for pushing out a specified penpoint from the plurality of penpoints in the direction of the pen tip to select it, the pen input apparatus further comprises a penpoint ground detector for detecting whether or not the penpoint pushed out by the penpoint pushing-out mechanism has been grounded, and the electromagnetic wave outputting unit outputs an electromagnetic wave of a different frequency for each penpoint grounded by the penpoint ground detecting means. This arrangement is excellent in the point that, in a pen input apparatus having a plurality of penpoints, the pen type can be changed by a simple construction, and hence the frequency can easily be switched.

Furthermore, it also can be constructed as an input system further comprising an application for generating image information according to position information and information about the type, and a computer system having a display screen for displaying the image information.

A digitizer is characterized by allowing a recording medium such as a piece of paper to be placed thereon, and grasping the track drawn on the recording medium by the penpoint of the writing instrument as electronic information, it is preferred in the point that the track drawn on the paper can be grasped as electronic information and displayed, for instance, on the display unit of a computer system.

Further, it is characterized in that the writing instrument includes an oscillation circuit for generating a predetermined frequency, and a coil for outputting an electromagnetic wave by the output from the oscillation circuit, and the oscillation circuit generates a different frequency for each selected penpoint.

Further, it is characterized that a writing instrument can comprise a pressure detector for detecting whether or not the penpoint selected by a penpoint selector was pressed against the recording medium, and a electromagnetic wave outputting unit generates an electromagnetic wave according to the detection result by the pressure detector. However, this does not mean the exclusion of the form in which an electromagnetic wave is generated while no pressure is detected by the pressure detector.

It should be noted that attribute information is information about at least either of the line color and the line thickness, and characterized in that the electronically recorded image information is displayed on a display unit by using a line of a display color corresponding to the color of the line drawn on the recording medium such as paper and/or of a thickness corresponding to the thickness of the drawn line.

Corresponding to a recording medium used for the present invention is, for instance, a CD-ROM medium, and a form is possible in which the program is read out by the CD-ROM reader in the computer system, and for instance, the program is stored in the hard disk drive in the computer system.

Now, the present invention will be described in detail according to the embodiment shown in the accompanying drawings.

FIG. 1(A) and FIG. 1(B) are schematic diagrams showing the whole electronic input system to which this embodiment is applied. The electronic input system generally comprises a computer system 10, an input apparatus 20, and a pen 30, which is a pen input system. As shown in FIG. 1(A), the computer system 10 and the input apparatus 20 are connected by a connecting cable 9 and arranged in a cover 8. By closing the cover 8, the respective structural parts forming the electronic input system can be accommodated in the cover 8, as shown in FIG. 1(B). The input apparatus 20 has a digitizer 50 and other parts as the structural elements, and the input system is made up of the input apparatus 20 and the pen 30 that is a pen input apparatus.

FIG. 2 is an explanatory view showing how the pen 30 makes input to the digitizer 50. The pen 30 has a penpoint for making a record on a piece of paper with a predetermined color and thickness, and includes a coil in the vicinity of the top end of its penholder, and radiates an electromagnetic wave from the coil. The digitizer 50 allows, for instance, A4 paper (210 mm (width)·297 mm (length)) to be placed on it, and receives the electromagnetic wave from the pen 30 to obtain coordinate information and pen type information. That is, as shown in FIG. 2, when a piece of paper is placed on the digitizer 50 and a drawing is made on the paper with the pen 30, the digitizer 50 simultaneously detects the position of the penpoint by receiving the electromagnetic wave, and its track is recorded in a memory 51. Further, along with the track, a frequency depending on a pen type is recognized, and the recognized frequency information is also recorded in the memory 51. The pen type information and track information recorded in the memory 51 are outputted (transmitted) to the computer system 10 as input information. In the computer system 10, in software for displaying the captured track, by previously relating pen types and attribute information on frequency, a track close to the image on the paper with respect to line width and color can be reproduced when displaying the track of the penpoint on a screen. Further, the digitizer 50 in this embodiment alone has resolution of the order of ±0.1 mm, can insure precision of the order of ±0.25 mm even if various errors are considered.

FIG. 3 is a block diagram schematically showing the pen 30 to which this embodiment is applied. The pen 30 includes a coil 32, an electromagnetic wave generating circuit 33, and a battery 34 in a penholder 31. Further, it includes a penpoint A 35 for supplying ink of a first color (for instance, black), and a penpoint B 38 for supplying ink of a second color (for instance, red), and the penpoint A 35 and penpoint B 38 respectively includes a penpoint ground detecting switch A 36 and a penpoint ground detecting switch B 39, and a penpoint pushing-out mechanism A 37 and a penpoint pushing-out mechanism B 40, which have a lever structure. The penpoint A 35 and penpoint B 38 have their tips selectively projected from the penholder 31, and the tips are pushed out by the user manipulating either of the two penpoint pushing-out mechanisms A 37 and B 40. FIG. 3 shows the state in which the penpoint A 35 is selected by the manipulation of the pen pushing-out mechanism A 37 by the user. The penpoint A 35 and the penpoint B 38 may be constructed to supply ink of different colors, respectively, or may be constructed to supply ink of the same color and different thickness. Further, both the color and thickness may be changed. Furthermore, it is also possible to select, for instance, fluorescent ink such as line marker or sign pen, or those containing special ink. That is, in this embodiment, a plurality of penpoints different in some attribute such as color or thickness are provided, it is constructed so that they can be selected one at a time, and in addition to the construction shown in FIG. 3, in which there are two penpoints, three, four, or many penpoints may be provided.

The penpoint ground detecting switches A 36 and B 39 provided on the penpoint A 35 and the penpoint 38, respectively detect whether or not the grounded penpoint A 35 or B 38 is grounded (whether writing is actually performed with the pen 30). The penpoint ground detecting switch A 36 and the penpoint ground detecting switch B 39 are constructed so that they are turned on when pressed against the paper by stroke pressure. The coil 32 is provided near the top end of the penholder 31 as shown in FIG. 3, and radiates the electromagnetic wave generated by the electromagnetic wave generating circuit 33 from the penpoint A 35 and the penpoint B 38. The battery 34 supplies power to these individual electric components.

FIG. 4 is a diagram for explaining the internal connections of the pen 30. The electromagnetic wave generating circuit 33 includes a frequency control circuit 43 for controlling the frequency generation, and an oscillation circuit 44 for actually generating a frequency. As shown in FIG. 4, it is assumed that the penpoint A 35 is now pushed out. When the user holds the pen 30 and the penpoint A 35 is pressed against the paper, the penpoint ground detecting switch A 36 is turned on by the stroke pressure, and the information on it (output signal) enters the frequency control circuit 43. In the frequency control circuit 43, in response to the penpoint ground detecting switch A 36 that was turned on, the oscillation circuit 44 is controlled so that the previously related frequency is generated. The output of the oscillation circuit 44 is connected to the coil 32, and an electromagnetic wave is radiated from the coil 32 to the digitizer 50 through the penpoint A 35. If the penpoint B 38 is pushed out, the oscillation circuit 44 is controlled by the frequency control circuit 43 in response to ON/OFF of the penpoint ground detecting switch B 39, and an electromagnetic wave of a predetermined frequency is radiated from the coil 32 to the digitizer 50 through the penpoint B 38.

As the frequencies radiated from the penpoint A 35 and the penpoint B 38, those of, for instance, 300 kHz–500 kHz can be used. In this embodiment, when the user changes the penpoint (for instance, when the user manipulates either of the penpoint pushing-out mechanism A 37 or the penpoint pushing-out mechanism B 40), the frequency of the electromagnetic wave output from the penpoint is automatically changed. As the frequencies employed can freely be set according to the types and number of penpoints, for instance, as shown below.

When the penpoint is not grounded: 420 kHz
When the penpoint A 35 is grounded: 320 kHz
When the penpoint B 38 is grounded: 340 kHz
When the penpoint C is grounded: 360 kHz Every penpoint is constructed so that it also radiates an electromagnetic wave of the predetermined frequency even when it is not in contact with the paper or it is ungrounded. This allows a predetermined input to be made to the computer system 10 even if the user performs a virtual recording in which the user moves the pen 30 without actually making writing on the paper with the pen 30.

Now, the signal processing from the digitizer 50 is described.

FIG. 5 is a diagram showing the block configuration in the signal processing in the input apparatus 20. The input apparatus 20 generally comprises the digitizer 50, controller 60, and memory 51. The digitizer 50 converts an analogue amount, which is a track of the pen 30 radiating a predetermined electromagnetic wave, to a digital amount, and outputs it. That is, if it is a two-dimensional digitizer, it takes out absolute coordinates which are XY-coordinates from a reference point, and outputs them to the controller 60. Further, it recognizes and outputs the frequency of the electromagnetic wave obtained from the pen 30 along with the track of the pen 30. In addition, the memory 51 temporarily holds the information obtained from the digitizer 50 as described above.

The controller 60 comprises a digitizer I/F 61 which is the interface between the digitizer 50, a CPU 62 for controlling the whole input apparatus 20, a memory I/F 63 which is the interface between the memory 51, a serial I/F 64 which is an interface for sending coordinate and pen type information to the computer system 10, a universal I/O port 65 which is the connector portion in the interface between the computer system 10 and used for inputting/outputting data, and a timer 66 for measuring various times of input statuses of the digitizer 50. The CPU 62 detects the statuses on the computer system 10 side through the universal I/O port 65.

FIG. 6 is a flowchart showing the flow of the data processing carried out in the controller 60. In the detection of position information performed by the CPU 62, first, the pen type and position information obtained by the digitizer 50 is read out via the digitizer I/F 61 (step 101). Then, whether or not the penpoint is grounded is determined by the frequency of the electromagnetic wave output from the penpoint (step 102). If the penpoint is grounded, the pen type and position information read out from the digitizer 50 is written into the memory 51 through the memory I/F 63 (step 103), and the flow returns to the beginning to execute step 101. If the penpoint is not grounded, whether or not data exists in the memory 51 is determined (step 104). If there is not data, the flow returns to the beginning to perform the reading from the digitizer 50 in step 101. If there is data, whether or not the penpoint is out of contact for a certain time is determined using the timer 66 (step 105). If the penpoint is not out of contact, the flow returns to the beginning for execution from step 101. If the penpoint is out of contact, the status of the computer system 10 is checked through the universal I/O port 65 (step 106), and determination is made as to whether or not data can be received by the computer system 10 (step 107). If data cannot be received, the flow returns to the beginning. If data can be received the data in the memory 51 is sent to the computer system 10 via the serial I/F 64 (step 108), and thereafter the flow returns to the beginning to carry out the process from step 101.

To the frequencies of the pen, numbers corresponding to them are previously assigned. As the internal data of the frequencies to be grasped, the frequency values themselves are not directly handled, but the related numbers are used. Those numbers can be determined as follows by way of example.

When the penpoint is not grounded: 420 kHz, frequency number 0

When the penpoint A 35 is grounded: 320 kHz, frequency number 1

When the penpoint B 38 is grounded: 340 kHz, frequency number 2

When the penpoint C is grounded: 360 kHz, frequency number 3

In the input apparatus 20 and the application on the computer system 10, one-to-one correspondence is set for the pen type (such as color or thickness) and the frequency to be generated for it. That is, when the track of a penpoint is recorded, the information on frequency (frequency number) is provided as an attribute in addition to the information on the track. In the computer system 10, by previously relating the information on pen type with the information on frequency in the software for displaying a captured track, a track close to the image on the paper can be reproduced with respect to the line width or color, transparency, and the like when an electronic track is displayed on a screen.

The data format used for information transmission is described below.

FIG. 7 is a diagram showing an example of the data format sent from the input apparatus 20 to the computer system 10. In this embodiment, attribute information (Attribute) 70 is transferred as a collective block for each coordinate along with X-position 71 and Y-position 72. The attribute information (Attribute) 70 includes start bit, pen up/down bit, frequency data, proximity bit, and switch status but. The start bit is a bit showing the leading head of the block. The pen up/down bit is a bit showing whether the penpoint is in contact, and the proximity bit and switch status bit are bits used when the pen is moved while it is floating. As the frequency data, a frequency number corresponding to the obtained frequency is indicated as a different value for each penpoint grounded.

FIG. 8 is a diagram showing another example of the data format sent from the input apparatus 20 to the computer system 10. In the example shown in FIG. 8, instead of the attribute information (Attribute) 70 shown in FIG. 7, two additional information storing fields, first attribute information (Attribute 1) 73 and second attribute information (Attribute 2) 74, are provided to enable attribute information to be transmitted to the computer system 10, which is the host. In the first attribute information (Attribute 1) 73, the contents of the attribute information (Attribute) 70 shown in FIG. 7 except the frequency data are contained, and in the second attribute information (Attribute 2) 74, the attribute information of the pen 30 is directly stored by predetermined symbols instead of the frequency data. The contents such as pen color, pen type, and pen thickness are shown. Thus, in the data transmission in this embodiment, the attribute information (Attribute) 70, first attribute information (Attribute 1) 73, and second attribute information (Attribute 2) 74 are transferred as a collective block for each coordinate along with the position information of X-position 71 and Y-position 72. This allows, in the computer system 10 that is the host, the use of application software for drawing the image of a track on a screen to always reference the attribute data in the drawing, thereby to faithfully reproduce the attribute which the pen 30 originally has.

As described above, in accordance with this embodiment, with respect to the pen 30 for the user to make inputting to the digitizer 50, a plurality of penpoints of different types can be included to allow the user to freely change them for use. Further, an arrangement is provided for allowing the frequency generated from the pen 30 to be automatically changed. With this, when the penpoint is changed, the line type recorded by the digitizer 50 can be automatically changed simultaneously with this, and thus an image similar to that recorded on the paper can be electronically recorded.

Further, when input data is transferred from the input apparatus 20 to the computer system 10, not only input coordinates information but also attribute information such as color information, line thickness information, and line type information is added. Conventionally, only coordinates information is transmitted from the input apparatus, and thus, to change the color or the like, it is needed to separately select a color or the like by application software in the computer system. In this embodiment, since not only coordinates information but also attribute information such as color, line type, and line thickness are transmitted, the user can directly transfer the writing made on the paper by the user, namely, information such as color from the state of the pen 30 in the input apparatus 20, and various inputs can be implemented by an easy operation.

In addition, in this embodiment, it is constructed that a plurality of penpoints is provided in the pen 30, and the type of a penpoint can be recognized by changing the frequency for each penpoint. However, even if it is constructed that one penpoint is provided for one pen 30, namely, one type is provided and an electromagnetic wave of a different frequency is generated for each pen, it can be similarly recognized in the digitizer 50. Further, with respect to data communication, instead of the construction of the pen 30 and digitizer 50 as shown in this embodiment, a construction can be provided in which buttons for specifying line color, line thickness, and the like are provided in a pointing device such as a mouse to enable the transmission of information on the line types such as color and thickness along with coordinate information. Also in such construction, the time and effort for specifying a line type can be eliminated in the application software running on the computer system 10, and the information drawn by the user including line attribute can be promptly transferred.

As described above, in accordance with the present invention, in an input apparatus for electronically recording a track written with a pen, inputting can be performed with a different pen type or color.

Further, when input information is transmitted from the input apparatus to a computer system, attribute information, for instance, color information, can be transmitted along with coordinate information.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the embodiments described above, but encompasses any and all embodiments within the scope of the following claims:

What is claimed is:

1. An input system comprising:
   a pen input apparatus including:
   a plurality of penpoints;
   a selector for selecting a specific penpoint from said plurality of penpoints contained within the pen input apparatus;
   a ground detector configured to detect when the specific penpoint is in contact with a writing surface;
   a control circuit coupled to the ground detector, the control circuit configured to distinguish between each of the plurality of penpoints; and
   a transmitter for transmitting at least the track of said specific penpoint as position information to a computer system.

2. The input system according to claim 1,
   wherein said pen input apparatus further comprises a frequency generator coupled to the control circuit for generating a different frequency for each said penpoint selected by said selector, and electromagnetic wave outputting unit for outputting an electromagnetic wave having the frequency generated by said frequency generator, and
   an input apparatus including a type recognition unit for recognizing the type of said penpoint selected by said selector said type recognition unit recognizes the type of said selected penpoint based on the frequency of the electromagnetic wave output by said electromagnetic wave outputting unit.

3. The input system according to claim 2,
   wherein said selector includes a penpoint pushing-out mechanism for pushing out a specific penpoint from the plurality of penpoints in the direction of the pen tip to select it,
   and said electromagnetic wave outputting unit outputs an electromagnetic wave of a different frequency for each penpoint grounded by said penpoint ground detector.

4. The input system according to claim 1, further comprising a computer system including an application for generating image information according to said position information and the information on said type, and a display screen for displaying said image information.

5. An electronic input apparatus for transmitting input information drawn with a pen to a computer system, comprising:
   a selector for selecting a specific penpoint from a plurality of penpoints in the pen;
   a ground detector configured to detect when the specific penpoint is in contact with a writing surface;
   a control circuit coupled to the ground detector, the control circuit configured to distinguish between each of the plurality of penpoints;
   a coordinate information recognition unit for recognizing a track drawn with a pen as coordinate information;
   a type recognition unit for recognizing the type of said penpoint; and
   a transmitter for transmitting said coordinate information recognized by said coordinate information recognition unit to said computer system, and adding the information on said type recognized by said type recognition unit to said coordinate information and transmitting them to said computer system.

6. The electronic input system according to claim 5, wherein said type recognition unit recognizes the type of said pen by a frequency of electromagnetic wave generated from said pen.

7. An electronic input apparatus comprising:
   a digitizer for grasping a track drawn by a penpoint selected in a writing instrument including a plurality of penpoints and allowing a predetermined penpoint to be selected from said plurality of penpoints contained within the digitizer, and recognizing the attribute of said penpoint;
   a ground detector configured to detect when the selected penpoint is in contact with a writing surface;
   a control circuit coupled to the ground detector, the control circuit configured to distinguish between each of the plurality of penpoints; and an interface for outputting the position information obtained from the track of said penpoint grasped by said digitizer, and attribute information on said recognized attribute.

8. The electronic input apparatus according to claim 7, wherein said digitizer allows a recording medium to be placed thereon, and grasps the track drawn on said recording medium by said penpoint of said writing instrument as electronic information.

9. The electronic input apparatus according to claim 7, wherein said writing instrument includes an oscillation circuit for generating a predetermined frequency, and a coil for outputting an electromagnetic wave by the output from said oscillation circuit, said oscillation circuit generating a different frequency for each penpoint selected.

10. A writing instrument for inputting to a digitizer, comprising:

a plurality of penpoints for drawing images on a recording medium placed on said digitizer;

a penpoint selector for selecting a specific penpoint from said plurality of penpoints contained within the writing instrument;

a ground detector configured to detect when the specific penpoint is in contact with a writing surface;

a control circuit coupled to the ground detector, the control circuit configured to distinguish between each of the plurality of penpoints; and an electromagnetic wave outputting unit for generating, to said digitizer, an electromagnetic wave of a different frequency for each penpoint selected by said penpoint selector.

11. The writing instrument for inputting to a digitizer according to claim 10, further comprising a pressure detector for detecting whether or not the penpoint selected by said penpoint selector was pressed against said recording medium, wherein said electromagnetic wave outputting unit generates an electromagnetic wave according to the detection result by said pressure detector.

12. A digitizer comprising:

a pen including a plurality of penpoints contained within the pen and a control circuit configured to distinguish between each the plurality of penpoints;

a track recognition unit for recognizing the track of a pen manipulated by the user, the pen including a plurality of penpoints;

a ground detector configured to detect when a selected penpoint is in contact with a writing surface;

a pen information recognition unit for recognizing the information on the type of said penpoint selected according to the information obtained from said pen; and an output unit for generating position information from the track recognized by said track recognition unit, and adding the information on the type of said penpoint recognized by said pen information recognition unit to the generated position information and outputting them.

13. A method for inputting coordinates comprising the steps of:

changing, at a pen, an output frequency of a frequency generator based on a selected penpoint from a plurality of penpoints contained within the pen;

detecting when the selected penpoint is in contact with a writing surface;

receiving position information of the pen based on the track drawn by the user on recording medium placed on a coordinate input apparatus, and receiving attribute information on the type of a line used for the track drawn from the coordinate input apparatus; and reflecting said received attribute information on said received position information to electronically record image information corresponding to the track drawn by the user on said recording medium.

14. The method for inputting coordinates according to claim 13, further comprising the steps of:

receiving attribute information on at least either one of the color and thickness of the line, and displaying said electronically recorded image information on a display unit by using a line having a display color corresponding to the color of the line drawn on said recording medium or a thickness corresponding to the thickness of the line drawn.

15. A method for transmitting coordinate information from a coordinate input apparatus to a computer system, comprising the steps of:

changing, at a pen, an output frequency of a frequency generator based on a selected penpoint from a plurality of penpoints contained within the pen;

detecting when the selected penpoint is in contact with a writing surface;

expressing the position information, based on a track drawn by the user with said coordinate input apparatus, in X- and Y-coordinates;

adding attribute information on the type of the line giving said track to said position information expressed by said X- and Y-coordinates, thereby to form a block; and transmitting the formed block in a predetermined unit.

16. The input system of claim 1, further comprising a frequency generator configured to change an output frequency according to the specific penpoint selected.

17. The electronic input apparatus of claim 5, further comprising a frequency generator configured to change an output frequency according to the specific penpoint selected.

18. The electronic input apparatus of claim 7, wherein the writing instrument further includes a frequency generator configured to change an output frequency according to the specific penpoint selected.

* * * * *